(12) United States Patent
Gan

(10) Patent No.: US 7,168,136 B2
(45) Date of Patent: *Jan. 30, 2007

(54) HINGE ASSEMBLY FOR PORTABLE ELECTRONIC DEVICE

(75) Inventor: Wen-Lin Gan, Shenzhen (CN)

(73) Assignee: Hon Hai Precision Ind. Co. Ltd., Taipei Hsien (TW)

( * ) Notice: Subject to any disclaimer, the term of this patent is extended or adjusted under 35 U.S.C. 154(b) by 128 days.

This patent is subject to a terminal disclaimer.

(21) Appl. No.: 10/921,372

(22) Filed: Aug. 18, 2004

(65) Prior Publication Data
US 2005/0150081 A1 Jul. 14, 2005

(30) Foreign Application Priority Data
Jan. 9, 2004 (TW) .............................. 93200364 U

(51) Int. Cl.
*E05D 3/10* (2006.01)
(52) U.S. Cl. .......................................... 16/367; 16/330
(58) Field of Classification Search ................. 16/367, 16/334, 331, 351, 330, 303, 328; 248/919–923; 455/575.3, 575.4, 566; 361/680–683; 348/373, 348/333.06
See application file for complete search history.

(56) References Cited

U.S. PATENT DOCUMENTS

| | | | |
|---|---|---|---|
| 6,292,980 B1 | 9/2001 | Yi et al. | |
| 6,633,643 B1* | 10/2003 | Ona | 379/433.13 |
| 2001/0053674 A1* | 12/2001 | Katoh | 455/90 |
| 2003/0040288 A1* | 2/2003 | Kang et al. | 455/90 |
| 2003/0101538 A1* | 6/2003 | Koshikawa | 16/277 |
| 2004/0141287 A1* | 7/2004 | Kim et al. | 361/683 |
| 2004/0200038 A1* | 10/2004 | Kim | 16/367 |
| 2005/0050687 A1* | 3/2005 | Shiba | 16/367 |
| 2005/0150080 A1* | 7/2005 | Lu et al. | 16/367 |
| 2005/0198779 A1* | 9/2005 | Jung et al. | 16/367 |

FOREIGN PATENT DOCUMENTS

| | | | |
|---|---|---|---|
| JP | 2001355371 A | * | 12/2001 |
| WO | WO 2003033923 A1 | * | 4/2003 |
| WO | WO 2005099232 A2 | * | 10/2005 |

* cited by examiner

*Primary Examiner*—Chuck Y. Mah
(74) *Attorney, Agent, or Firm*—Wei Te Chung

(57) ABSTRACT

A hinge assembly (10) for interconnecting a main body and a cover of a portable electronic device includes a hinge housing (20), and a first hinge apparatus (30) and a second hinge apparatus (40) rotatably contained in the housing. The first hinge apparatus includes a cam (36) rotatably attached to the housing and fixed to the main body, and other elements housed in the housing and fixed relative thereto. The second hinge apparatus includes a boom (43) fixed to the cover, a boom cover (48), a support (41) rotatably attached to the boom and fixed to the housing, and two ball bearings contained between the boom and the boom cover. The cover is opened relative to the main body by being rotated about an X-axis of the first hinge apparatus. The cover is then rotated relative to the housing about a Y-axis of the second hinge apparatus.

13 Claims, 5 Drawing Sheets

HINGE ASSEMBLY FOR PORTABLE ELECTRONIC DEVICE

BACKGROUND OF THE INVENTION

1. Field of the Invention

The present invention relates generally to a hinge, and more particularly to a hinge used for folding portable electronic devices. The invention relates to a contemporarily filed application titled "HINGE ASSEMBLY FOR PORTABLE ELECTRONIC DEVICE" and having the same assignee with the instant invention.

2. Prior Art

Hinges are almost universally used in modern portable electronic devices such as mobile phones and PDAs (Personal Digital Assistants). These portable electronic devices typically comprise two housings. Hinges are used to join the two housings together, and to enable one housing to be folded upon the other one. Normally, one of the housings is called a body and contains most of the electronic components of the portable electronic device. The other housing is called a cover and contains fewer or even no electronic components.

One kind of hinge is disclosed in U.S. Pat. No. 6,292,980 issued to Young-Jin Yi et al (the '980 patent). In the '980 patent, as shown in FIG. 5, a hinge mechanism 500 includes: a cam 510 having a mountain-shaped portion 512 on one end, and a shaft portion 514 on the other end which is used for engaging a cover of the mobile phone; a corresponding cam follower 520 having a bottom wall 522; and a spring 530 used for pressing the cam follower 520 to resist on the cam 510. The cam 510, the cam follower 520 and the spring 530 are all contained in a hinge housing 540, and covered by a hinge cover 550. The hinge housing 540 and hinge cover 550 are engaged in a body of the mobile phone. In use, the mountain-shaped portion 512 moves along the bottom wall 522. The cam 510 together with the cover rotates relative to the body of the mobile phone in a predetermined direction. However, the scope of rotation of the cover is limited. Many modern portable electronic devices need a cover thereof to be able to rotate to a variety of orientations.

Therefore, a hinge with a relatively simple structure is desired to overcome the above-described limitations.

SUMMARY OF THE INVENTION

Accordingly, an object of the present invention is to provide a hinge with a relatively simple and stable unified structure, and which enables front and rear faces of a foldable cover of a portable electronic device to be conveniently turned over.

To achieve the above-mentioned object, a hinge assembly of the present invention is for interconnecting a main body and a cover of a portable electronic device. The hinge assembly includes a hinge housing, a first hinge apparatus, and a second hinge apparatus. The hinge housing is rotatably contained in the main body, and defines a first engaging hole containing the first hinge apparatus therein, and a second engaging hole containing the second hinge apparatus therein. The first engaging hole is perpendicular to the second engaging hole. The first hinge apparatus includes a cam rotatably attached to the hinge housing and fixed to the main body, a sleeve fixed in the first engaging hole, a cam follower fixed in the sleeve, and two roller bearings between the cam and the cam follower. The second hinge apparatus includes a boom adapted to be fixed to the cover, a support rotatably attached to the boom and fixed to the hinge housing, a boom cover fixed on an end of the boom, and two ball bearings contained between the boom and the boom cover. The cover is opened relative to the main body by being rotated about an X-axis of the first hinge apparatus. The cover is then rotated relative to the hinge housing about a Y-axis of the second hinge apparatus.

Other objects, advantages and novel features of the invention will become more apparent from the following detailed description when taken in conjunction with the accompanying drawings, in which:

DETAILED DESCRIPTION OF THE INVENTION

Figure 1:
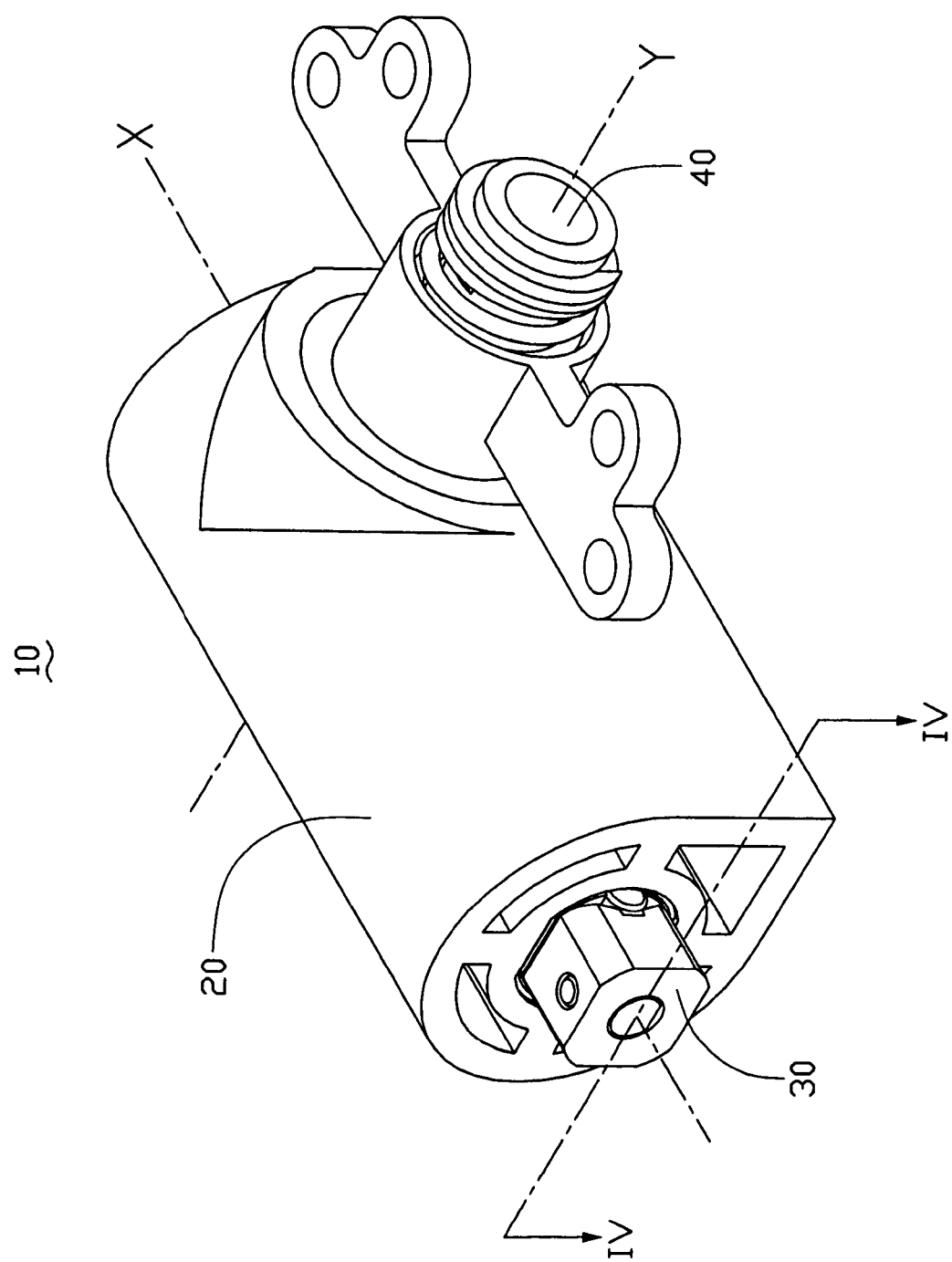
FIG. 1 is an isometric view of a hinge assembly in accordance with the present invention.

Referring to FIG. 1, an exemplary hinge assembly 10 of the present invention includes a hinge housing 20, a first hinge apparatus 30 and a second hinge apparatus 40.

Figure 2:
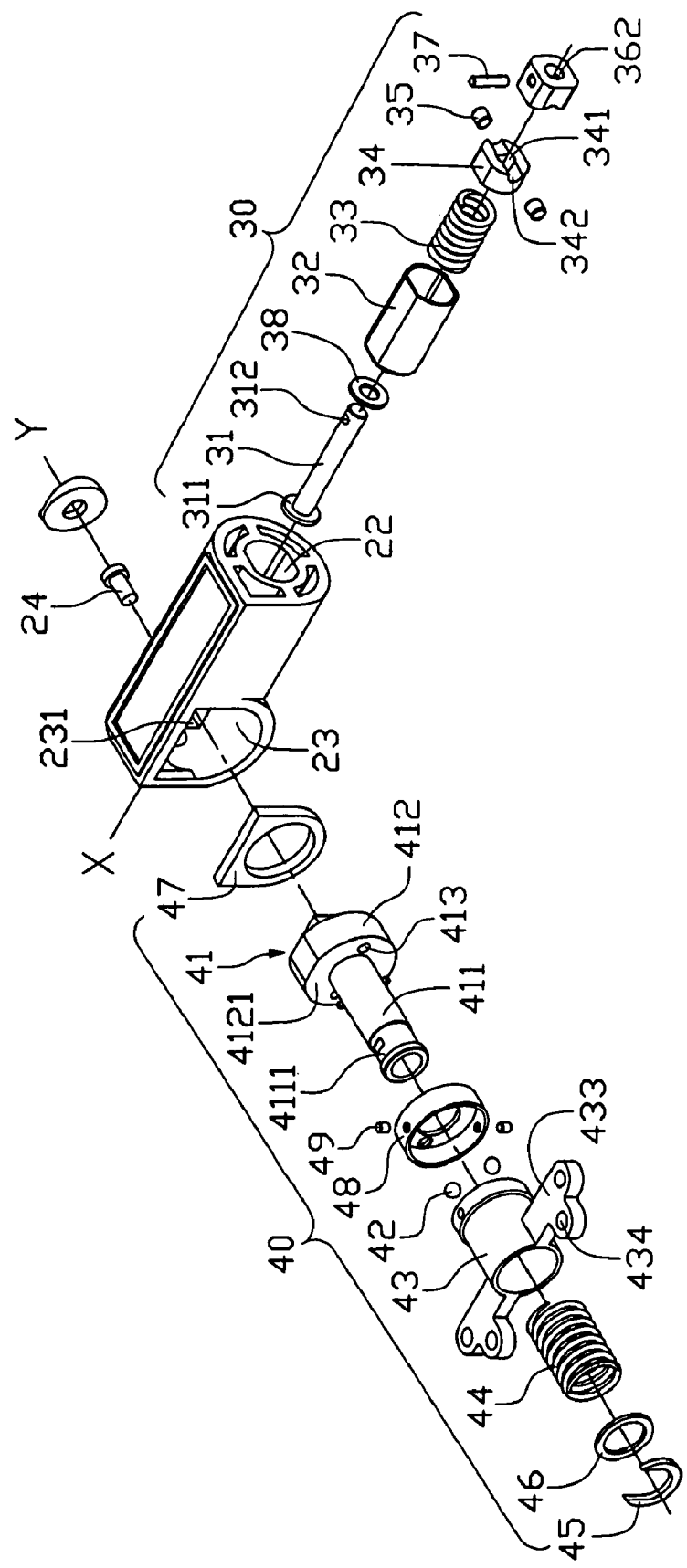
FIG. 2 is an exploded, isometric view of the hinge assembly of FIG. 1, viewed from another aspect.
Figure 3:
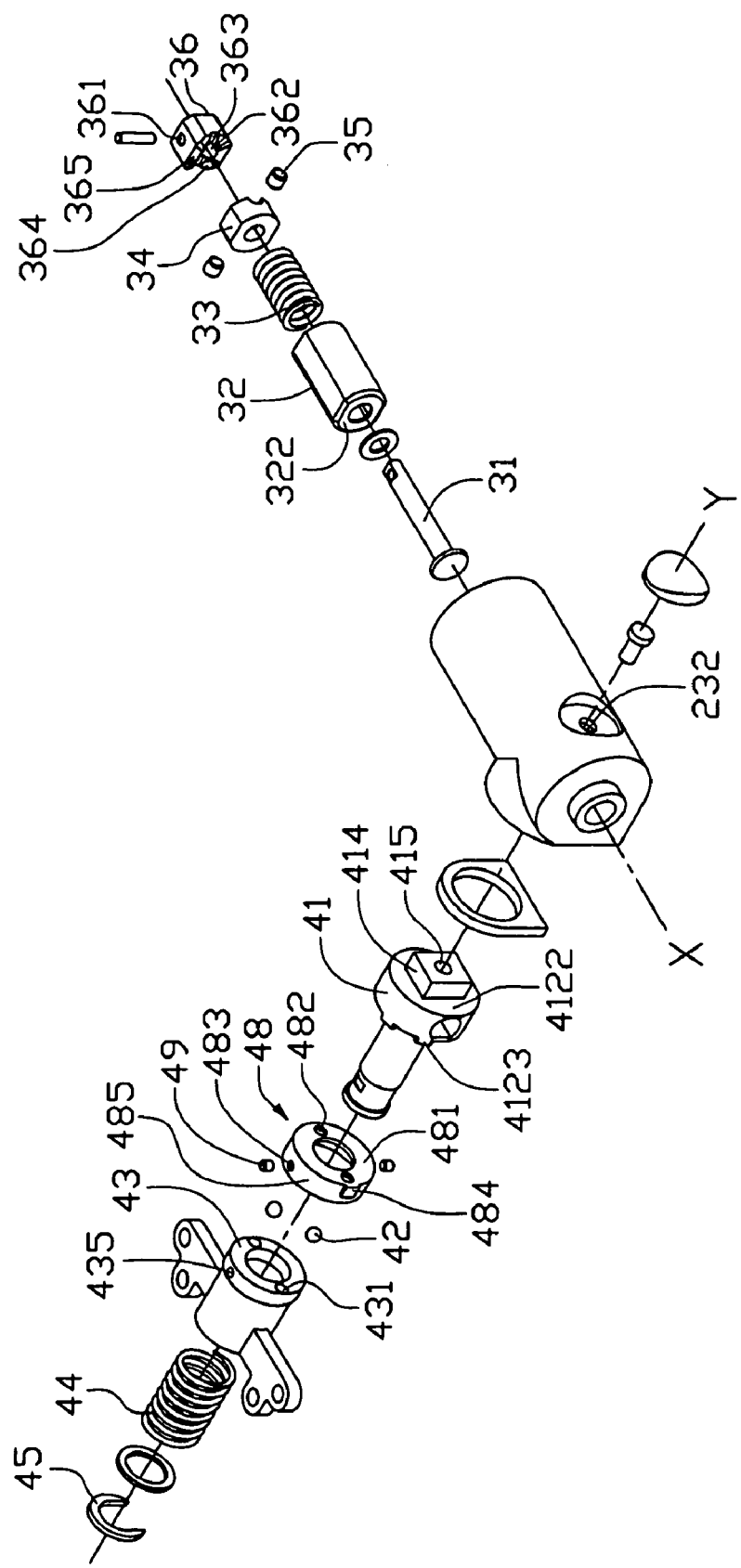
FIG. 3 is similar to FIG. 2, but viewed from still another aspect.

Referring to FIGS. 2 and 3, the hinge housing 20 defines a first engaging hole 22 set along an X axis, and a second engaging hole 23 set along a Y axis. The first engaging hole 22 is used for containing the first hinge apparatus 30. The second engaging hole 23 is used for containing the second hinge apparatus 40. The second engaging hole 23 includes two round openings at two opposite sides of the hinge housing 20 respectively, and a square cavity 231 and a thin hole 232 defined in a middle portion of the hinge housing 20. One of said openings communicates with the other one through the square cavity 231 and the thin hole 232. It is to be understood that the square cavity 231 can alternatively be polygonal.

The first hinge apparatus 30 is provided for enabling a cover of a portable electronic device, such as a mobile phone, to rotate about the X-axis. The first hinge apparatus 30 includes a mandrel 31, a washer 38 (optional), a sleeve 32, a spring 33, a cam follower 34, two roller bearings 35, a cam 36, and a first orientation pin 37. The mandrel 31 includes a flange 311 at one end thereof. A first through hole 312 is defined in an opposite end of the mandrel 31, and is perpendicular to the X-axis. The cam follower 34 defines a second through hole 341, and a pair of first recesses 342 at respective opposite sides of and in communication with the second through hole 341. The cam 36 defines a pair of first orientation holes 361 parallel with the first through hole 312, a third through hole 362 having a same axis as that of the second through hole 341 and being in communication with the first orientation holes 361, and two second recesses 363 at respective opposite sides of and in communication with the third through hole 362. A pair of inclines 364 is defined at respective opposite sides of each second recess 363. An upper mountain-shaped portion 365 is defined between two upper of the four inclines 364. A lower mountain-shaped portion 365 is defined between two lower of the four inclines 364. The sleeve 32 includes an end portion 322, corresponding to the flange 311. An outer diameter of the sleeve 32 is slightly less than an inner diameter of the first engaging hole 22.

The second hinge apparatus 40 is provided to enable the cover of the mobile phone to rotate about the Y-axis. The second hinge apparatus 40 includes a support 41, a boom cover 48, two second orientation pins 49, two ball bearings 42, a boom 43, a spring 44, a washer 46 (optional), and a C-shaped spring clip 45. The support 41 includes a hollow column 411 extending from a base 412, thereby defining a step surface 4121 on the base 412. Two opposite pits 413 are defined in the step surface 4121, and a pair of tappets 4123 is formed on the step surface 4121. The base 412 also has an end surface 4122, which is opposite to the step surface 4121. A square block 414 extends from the end surface 4122. A fourth orientation hole 415 is defined in the end surface 4122, corresponding to the thin hole 232 of the square cavity 231. The boom cover 48 includes a bottom 481, and a round wall 485 extending from the bottom 481. The bottom 481 defines two opposite fourth through holes 482 therein, corresponding to the ball bearings 42. The round wall 485 defines two opposite second orientation holes 483 therein. A tappet 484 is formed on a circumferential periphery of the round wall 485. The boom 43 is substantially a hollow sleeve with two opposite wings 433 extending from one end thereof, and is used for containing the support 41. The boom 43 defines two opposite bores 431 in an end surface thereof corresponding to the ball bearings 42, and a pair of opposite third orientation holes 435 in a circumferential surface thereof corresponding to the second orientation holes 483. A diameter of each bearing ball 42 is greater than a diameter of each fourth through hole 482, and greater than a diameter of each bore 431. An inner diameter of the boom 43 is greater than an outer diameter of the hollow column 411 of the support 41. The boom 43 forms an internal step surface 432 (see FIG. 4) at said end thereof, for retaining an end of the spring 44 thereat. The wings 433 each define a pair of fixing holes 434 therein, for connection of the wings 433 to the cover of the mobile phone. The spring 44 is located around the hollow column 411 of the support 41, and is contained in the boom 43. The spring clip 45 is engaged in a round groove 4111 of the hollow column 411.

Figure 4:
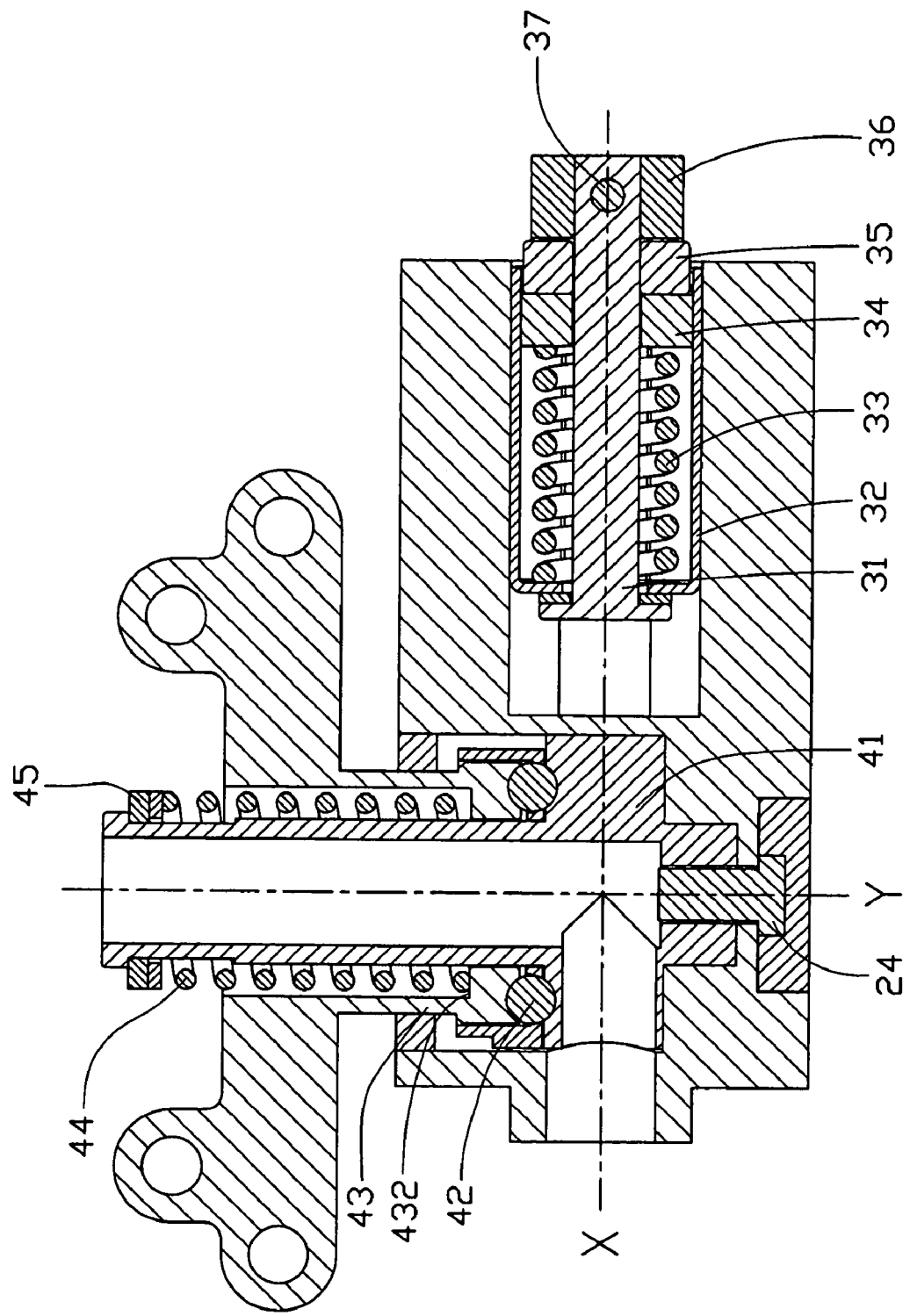
FIG. 4 is a cross-sectional view taken along line IV—IV of FIG. 1.
Figure 5:
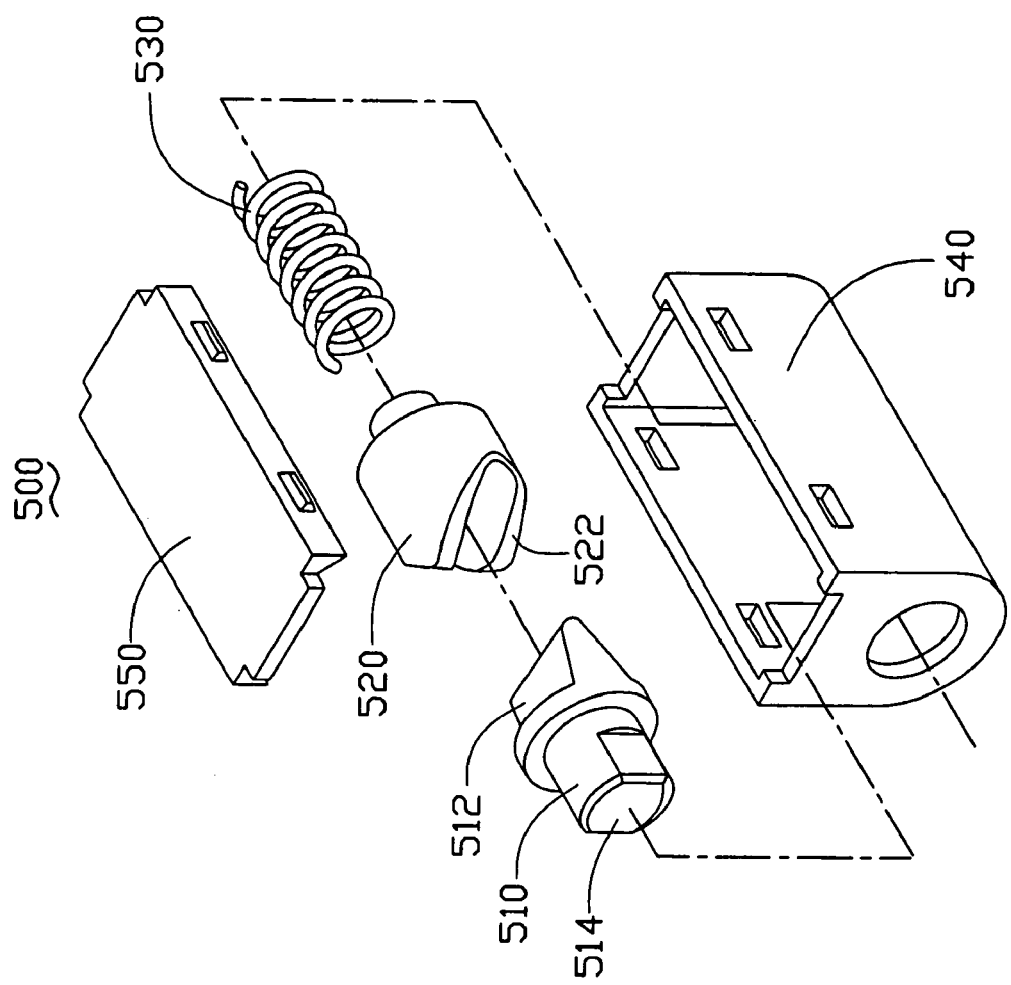
FIG. 5 is an exploded, isometric view of a hinge of the prior art.

Referring to FIG. 4, the hinge assembly 10 is assembled in two independent stages. One stage is assembly of the first hinge apparatus 30, and the other stage is assembly of the second hinge apparatus 40. In assembly of the first hinge apparatus 30, first, the mandrel 31 is sequentially inserted through the washer 38, the sleeve 32, the spring 33, the second though hole 341 of the cam follower 34, and the third through hole 362 of the cam 36. Then the flange 311 of the mandrel 31 is pressed against the end portion 322 of the sleeve 32. The roller bearings 35 are respectively received in a pair of cavities cooperatively defined by the first recesses 342 of the cam follower 34 and the second recesses 363 of the cam 36. Next, the flange 311 is pushed so that the spring 33 is slightly compressed, and the first orientation pin 37 is received in the first orientation holes 361 of the cam 36 and the first through hole 312 of the mandrel 31. Finally, the sleeve 32 with all the above-described parts attached thereto is received in the first engaging hole 22 of the hinge housing 20. The washer 38 prevents abrasion between the flange 311 of the mandrel 31 and the end portion 322 of the sleeve 32.

In assembly of the second hinge apparatus 40, first, the support 41 is received in the second engaging hole 23 of the hinge housing 20, with the square block 414 of the base 412 engaged in the square cavity 231. Then a spike 24 is inserted through the thin hole 232 of the square cavity 231 and fixed in the fourth orientation hole 415 of the square block 414, thereby fastening the square block 414 in the hinge housing 20. Next, the boom cover 48 is placed around said end of the boom 43, with the ball bearings 42 being respectively partially received in the fourth through holes 482 and the bores 431. Then, two second orientation pins 49 are respectively inserted through the second orientation holes 483 and the third orientation holes 435, thereby fixing the boom cover 48 on the boom 43. After that, the boom 43 is engaged around the hollow column 411 of the support 41. The ball bearings 42 are removably engaged in the pits 413 of the base 412. Finally, the spring 44 is received in the boom 43 around the hollow column 411 of the support 41. One end of the spring 44 abuts the step surface 432 of the boom 43. The washer 46 is placed around the round groove 4111 of the hollow column 411. The spring 44 is compressed slightly, so that the spring clip 45 can be engaged in the round groove 4111. Thus the opposite end of the spring 44 resiliently abuts the washer 46. The second hinge apparatus 40 is thus assembled. The washer 46 prevents abrasion between the spring clip 45 and the spring 44. Further, a seal 47 (optional) can also be provided in the second engaging hole 23 for airproofing.

When the hinge assembly 10 is assembled in the mobile phone, the hinge housing 20 is received in a cavity of a main body of the mobile phone. The cam 36 of the first hinge apparatus 30 is fixed in the main body, and the wings 433 of the second hinge apparatus 40 are fixed to the cover of the mobile phone. Thus the hinge housing 20 can rotate in the main body around the X-axis, with the cam 36 remaining stationary relative to the main body, and the wings 433 can rotate the cover relative to the main body.

When the cover is opened, the hinge housing 20 is rotated about the X-axis, with the roller bearings 35 of the first hinge apparatus 30 rotating on the corresponding inclines 364 out from the second recesses 363, and the spring 33 being compressed in the sleeve 32. Then the roller bearings 35 move across the mountain-shaped portions 365 of the cam 36, and along corresponding inclines 364 into corresponding second recesses 363, with the spring 33 decompressing in the sleeve 32. Thus the cover is stopped in a predetermined open position that is 180° from its original position. It is to be understood that more pairs of second recesses 363 can be defined in the cam 364 to provide a variety of predetermined open positions for the cover.

When the cover is rotated so that it changes direction relative to the hinge housing 20, the wings 433 rotate about the Y-axis, and the ball bearings 42 of the second hinge apparatus 40 disengage from the pits 413 and move along the step surface 4121. The spring 44 is compressed in the boom 43 during this process. The ball bearings 42 finally engage in corresponding pits 413, and the spring 44 decompresses to its original position. The cover is thus stopped in a predetermined orientation that is 180° from its original orientation. It is to be understood that more pairs of pits 413 can be defined in the step surface 4121 in order to provide more predetermined orientations for the cover.

The process of closing the cover is substantially the reverse of the above-described processes of rotating the cover and opening the cover.

In an alternative embodiment, the spring 44 can be located around the boom 43, with one end of the spring 44 abutting an external step surface (not labeled) of the boom 43, and the opposite end of the spring 44 abutting the washer 46. In such configuration, the wings 433 extend from an opposite end of the boom 43 that has the external step surface. In addition, the support 41 and the hinge housing 20 can be formed as a single integrated body. Furthermore, the first hinge apparatus 30 used for interconnecting the cover and the main body can be replaced by a known hinge mechanism.

Compared with currently known hinges, the hinge assembly 10 of the present invention provides a relatively simple and stable unified apparatus. The hinge assembly 10 enables convenient operation of the mobile phone, and also enables front and rear surfaces of a foldable cover of the mobile phone to be conveniently turned over.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A hinge assembly for interconnecting a main body and a cover of a portable electronic device, comprising:

a hinge housing adapted to be rotatably attached to the main body, and defining a first engaging hole and a second engaging hole perpendicular to the first engaging hole;

a first hinge apparatus contained in the first engaging hole for enabling the cover to open relative to the main body; and a second hinge apparatus contained in the second engaging hole, for enabling the cover to rotate about an axis perpendicular to the hinge housing after the cover is opened relative to the main body;

wherein the first hinge apparatus comprises a sleeve fixed in the first engaging hole, a cam follower fixed in the sleeve, a cam rotatably attached to the hinge housing and adapted to be fixed to the main body, and two roller bearings between the cam and the cam follower; and the second hinge apparatus comprises a boom adapted to be fixed to the cover, a support rotatably attached to the boom and fixed to the hinge housing, a boom cover fixed on an end of the boom, and two ball bearings between the boom and the boom cover.

2. The hinge assembly as claimed in claim 1, wherein the first hinge apparatus further comprises a mandrel with a first spring member disposed therearound, and an orientation pin connecting the cam and the mandrel together, wherein the cam follower is biased by the first spring member.

3. The hinge assembly as claimed in claim 1, wherein the second hinge apparatus further comprises a second spring member disposed around the support, the boom being rotatably engaged around the second spring member and the support.

4. The hinge assembly as claimed in claim 3, wherein the support comprises a base and a column extending from the base, the column defines a round groove in an end thereof distal from the base, and a spring clip is engaged in the round groove.

5. The hinge assembly as claimed in claim 4, wherein at least one wing extends from the boom, said wing defining one of more fixing holes therein.

6. The hinge assembly as claimed in claim 5, wherein the boom defines a step surface therein, the step surface being biased by the second spring member.

7. The hinge assembly as claimed in claim 5, wherein the support further comprises a block extending from an end of the base for securing the second hinge apparatus in the second engaging hole.

8. A hinge assembly for interconnecting a main body and a cover of a portable electronic device, comprising:

a hinge housing adapted to be rotatably attached to the main body, and comprising a first engaging hole and a second engaging hole perpendicular to the first engaging hole;

a first hinge apparatus contained in the first engaging hole, for enabling the cover to open relative to the main body; and a second hinge apparatus contained in the second engaging hole, for enabling the cover to rotate about an axis perpendicular to the hinge housing after the cover is opened relative to the main body, the second hinge apparatus having a support fixed relative to the hinge housing, a spring member disposed around the support, a boom rotatably covering the spring member and the support and fixed relative to the cover, and a boom cover fixed on an end of the boom.

wherein the boom defines a bore in an end surface thereof, the boom cover defines a through hole in a bottom thereof, and a ball bearing is contained between the bore and the through hole.

9. The hinge assembly as claimed in claim 8, wherein the support comprises a base, a column extending from an end of the base, and a block extending from an opposite end of the base, the block being engaged in the second engaging hole of the hinge housing.

10. The hinge assembly as claimed in claim 8, wherein the support comprises a base, a column extending from an end of the base, and a block extending from an opposite end of the base.

11. The hinge assembly as claimed in claim 8, wherein at least one wing extends from the boom, said wing defining one or more fixing holes therein.

12. The hinge assembly as claimed in claim 8, wherein the boom defines a step surface therein, the step surface being biased by the spring member.

13. A hinge assembly for interconnecting a main body and a cover of a portable electronic device, comprising:

a hinge housing adapted to be rotatably attached to the main body, and comprising a first engaging hole and a second engaging hole perpendicular to the first engaging hole;

a first hinge apparatus received in the first engaging hole, for enabling the cover to open relative to the main body; and a second hinge apparatus received in the second engaging hole, for enabling the cover to rotate about an axis perpendicular to the hinge housing after the cover is opened relative to the main body;

wherein the first hinge hole and said second hinge hole are respectively located at two opposite ends of the housing, and the second hinge apparatus has a boom adapted to be fixed to the cover, a support rotatably attached to the boom and fixed to the hinge housing, a boom cover fixed on an end of the boom, and one bearing between the boom and the boom cover.

* * * * *